United States Patent [19]

Iwamoto et al.

[11] Patent Number: 4,552,453

[45] Date of Patent: Nov. 12, 1985

[54] LENS POSITIONING MECHANISM FOR A COPYING MACHINE

[75] Inventors: Ken-ichi Iwamoto; Tadaaki Kawano; Hiroaki Uchiyama; Takahiro Fukunaga, all of Nara; Katsuyoshi Fujiwara, Sennan; Yoshikado Yamada, Kashihara, all of Japan

[73] Assignee: Sharp Kabushiki Kaisha, Osaka, Japan

[21] Appl. No.: 540,659

[22] Filed: Oct. 11, 1983

[30] Foreign Application Priority Data

Oct. 14, 1982 [JP] Japan .............................. 57-181066

[51] Int. Cl.⁴ ...................... G03B 27/34; G03B 27/40; G03B 27/70

[52] U.S. Cl. ........................................ 355/57; 355/58

[58] Field of Search .......................... 355/57, 58, 8, 11

[56] References Cited

U.S. PATENT DOCUMENTS

| | | | |
|---|---|---|---|
| 3,614,222 | 4/1970 | Post et al. | 355/8 |
| 4,421,405 | 12/1983 | Nagahara | 355/58 |
| 4,453,824 | 6/1984 | Miyake et al. | 355/57 |

*Primary Examiner*—Richard A. Wintercorn

*Attorney, Agent, or Firm*—Birch, Stewart, Kolasch & Birch

[57] ABSTRACT

A lens positioning mechanism for an electrophotographic copying machine capable of reproducing a copy of an original at a plurality of different magnifications one at a time, which comprises an optical apparatus including a lens assembly supported for movement to any one of several operative positions each required for the reproduction of a copy at the respective magnification. The lens assembly is rigidly mounted on a lens mount movable in a direction perpendicular to the optical axis and mounted on a lens carriage movable in a direction close towards and away from a photoreceptor.

3 Claims, 9 Drawing Figures

LENS POSITIONING MECHANISM FOR A COPYING MACHINE

BACKGROUND OF THE INVENTION

The present invention generally relates to an electrophotographic copying machine of a type capable of making copies at different magnifications one at a time and, more particularly, to a lens positioning mechanism for repositioning an objective lens assembly according to the selection of one of the magnifications available in the copying machine.

In most types of electrophotographic copying machines, there is employed an optical apparatus comprising a plurality of mirrors and an objective lens assembly for forming an image of an original to be copied on a photoreceptor. Where the image of the original to be copied is to be formed on the photoreceptor at a magnification, or on a scale, equal to the size of the image of the original, the distance a of the optical path between the original and the objective lens assembly is set to be equal to the distance b of the optical path between the objective lens assembly and the photoreceptor while the mirrors are arranged in such a manner as shown in FIG. 1 of the accompanying drawings to make each of the distances a and b twice the focal length f of the lens assembly. Referring to FIG. 1, rays of light reflected from the original 8 placed on a transparent original support 1, such as a glass plate, are guided towards the objective lens assembly 5 by way of first, second and third mirrors 2, 3 and 4 and, after having passed through the lens assembly 5, towards a photoreceptor drum 7 by way of a fourth mirror 6, thereby casting the image of the original 8 upon the surface of the photoreceptor drum 7. It is well known that, in the case of equal size reproduction, the distance a of the optical path between the original 8 and the lens assembly 5 by way of the mirrors 2 to 4 and that b of the optical path between the lens assembly 5 and the photoreceptor drum 7 by way of the mirror 6 have the following relationship with respect to the focal length f of the lens assembly 5: $(1/a)+(1/b)=1/f$.

On the other hand, the magnification m is known as expressed by the ratio of the distance b relative to the distance b, namely, $m=b/a$. Accordingly, where the equal size reproduction is desired to be accomplished, the mirrors 2, 3, 4 and 6 have to be arranged relative to the lens assembly 5 so as to establish the following relationship: $a=b=2f$.

It is also known that, where a copy is desired to be made at a magnification different from that used during the equal size reproduction, one of the distances a and b has to be adjusted relative to the other of the distances a and b according to the desired magnification and the lens assembly and the mirrors have to be correspondingly repositioned. By way of example, in a copying machine employing the same lens assembly for the reproduction at the different magnifications, the adjustment can be accomplished by repositioning both the lens assembly 5 and the mirror 6. The direction of movement of the lens assembly 5 is, however, to be parallel to the optical axis of such lens assembly 5 in the case where the original to be copied is, irrespective of its size, adapted to be centered on the original support and the photoreceptor drum is correspondingly adapted to receive the image of the original at its center. That is, since the original laid on the original support and a copying paper on which the image of the original is to be reproduced are all centered with the optical axis of the lens assembly 5, the movement of the lens assembly 5 in a direction axially of the optical axis thereof to a position different from that that has been required during the equal size reproduction results in a proper reproduction of the image of the original on the copying paper at an increased or reduced magnification. Thus, if the lens assembly 5 is moved axially of the optical axis to a position shown by the chain line in FIG. 1, the fourth mirror 6 has to be moved in the same direction to a position shown by the corresponding chain line in FIG. 1 in order for the machine to be set at a magnification determined by the ratio of the distance b relative to the distance a, that is, b/a. At the same time, the fourth mirror 6 is also rotated in a direction shown by the arrow because the movement of the mirror 6 when kept in parallel relation to the original position may result in the reflection of the optical image at a position displaced from the position P on the photoreceptor drum. Thus, by adjusting the respective positions of the lens assembly and the mirror 6, the copying operation can be accomplished at a magnification defined by the ratio of the distance b relative to the distance a. In such a copying machine, the copying paper is always transferred to the photoreceptor drum 7 while having been aligned with the center thereof.

On the other hand, in the alignment method wherein the original is adapted to be laid on the original support with its one side held constantly in abutting relation to one edge of the original support, the mere adjustment of the lens assembly 5 in a direction parallel to the optical axis of the latter does not result in the formation of the image of the original correctly on the photoreceptor drum 7. This is because the side of the original on the original support held against the edge of the latter will not align with a corresponding side edge of a copying paper. Therefore, in such a method, the lens assembly has to be also moved in a direction perpendicular to the plane of the drawing of FIG. 1. This is essentially required for a particular area of the photoreceptor drum 7, where the image of the original is formed, to be exactly aligned with the copying paper having its side edge regulated.

This will now be discussed in detail with particular reference to FIG. 2. Referring to FIG. 2, the original 8 is shown as placed on the original support 1 with its one side 8-1 held against a reference edge of the original support 1. The photoreceptor drum 7 is schematically shown in the form of a photoreceptor surface. The arrow marking shown beside the original 8 in FIG. 2 represents the direction of movement of the original support and, hence, the original 8 and the arrow marking shown beside the photoreceptor 7 represents the direction of rotation of the photoreceptor 7. As shown, the image of the side 8-1 of the original which has been projected through an optical apparatus 9, including the mirrors 2 to 4 and 6 of the lens assembly 5, so as to align with a reference edge 7-1 of the photoreceptor 7 during the equal size reproduction, will not be formed on the photoreceptor 7 in alignment with the reference edge 7-1 if the lens assembly 5 is merely repositioned in a direction parallel to the optical axis h thereof during an attempt to make a copy at a reduced magnification. Accordingly, in order to keep the side 8-1 of the original aligned with the reference edge 7-1 of the photoreceptor 7 irrespective of the magnification, the lens assembly 5 has to be adjusted in a diagonal direction, as shown by the arrow.

According to the above described method, where the number of magnifications available is two, for example, an equal size reproduction (the ration b/a being 1) and a reduced magnification (the ration b/a being smaller than 1), the linear adjustment of the lens assembly 5 in the diagonal direction effectively results in the formation of the image of the original on the photoreceptor 7 with the side 8-1 aligned with the reference edge 7-1. However, if it were three or more, at least one or more of the optical image can no longer be aligned exactly with the reference edge of the photoreceptor. In other words, the optical image will be merely formed adjacent the reference edge of the photoreceptor.

The foregoing description applies where, while the lens assembly 5 has a fixed focal length f, change in magnification is accomplished by repositioning the lens assembly 5 together with a corresponding repositioning of the mirror 6. However, the mirror 6 may not be adjusted if an auxiliary lens assembly is employed to change the focal length f of the lens assembly and the sum of the distances a and b is kept at a constant value. It is to be noted that a similar description applies where, instead of the use of the auxiliary lens assembly, the lens assembly 5 is employed in the form of a zoom lens assembly.

In any event, U.S. Pat. No. 3,614,222, patented Oct. 19, 1971, to Gerald Post et al., discloses a copying machine in which the transparent original support is adapted to support originals thereon one at a time in a manner with two adjacent sides of each original held always in abutting relation to two right-angled edges of the original support no matter what magnification the image of each original is reproduced at. This patent also discloses a mechanism operable, when the magnification is changed, to drive the lens assembly in a direction close to or away from the photoreceptor and, simultaneously, in a direction perpendicular to the optical axis of the lens assembly. More specifically, in the copying machine disclosed in the above mentioned patent, when the magnification is to be changed from, for example, a 1:1 ratio to a 1:0.7 ratio, the lens assembly which has been held at a certain position during the equal size reproduction is repositioned to a position closer to the photoreceptor drum than at such certain position and offset laterally from such certain position in a direction generally perpendicular to the optical axis thereof. For this purpose, according to the 222 patent, a carriage for the support of the lens assembly is, while the lens assembly is rigidly mounted thereon with its optical axis extending at right angles to a plane parallel to the photoreceptor surface, adapted to be driven in a direction close to and away from the photoreceptor at a preset angle relative to the optical axis each time the magnification is changed.

SUMMARY OF THE INVENTION

The present invention is intended to provide a lens positioning mechanism for a copying machine comprising a lens assembly supported for movement not in one dimension, but in two dimensions to enable the image of an original to be formed (or projected) on a predetermined image forming location with one side of the original optically aligned with one end of a photoreceptor drum.

BRIEF DESCRIPTION OF THE DRAWINGS

This and other objects and features of the present invention will become apparent from the following description taken in connection with a preferred embodiment thereof with reference to the accompanying drawings, in which.

DETAILED DESCRIPTION OF THE EMBODIMENT

Figure 1:
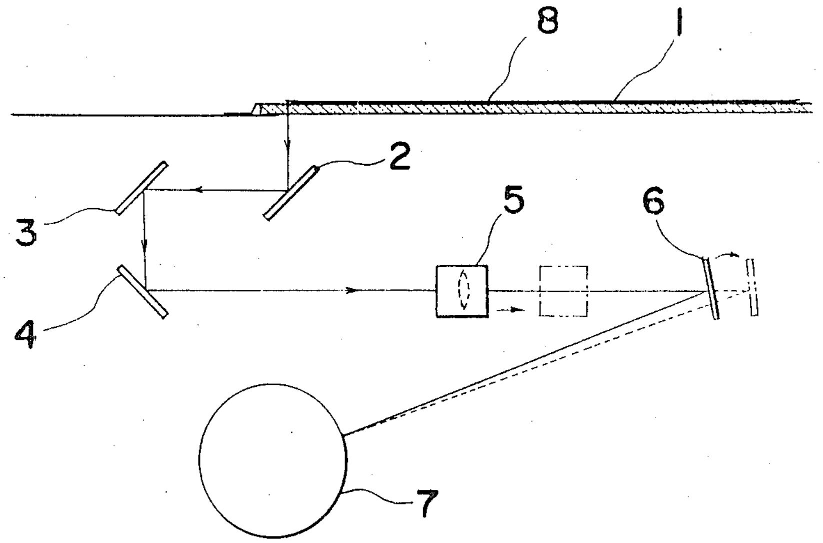
Fig. 1 Prior Art
FIG. 1 is a schematic side elevational view of an electrophotographic copying machine, showing how the magnification can be changed.

Before the description of a preferred embodiment of the present invention proceeds, it is to be noted that like parts are designated by like reference numerals throughout the accompanying drawings.

Figure 2:
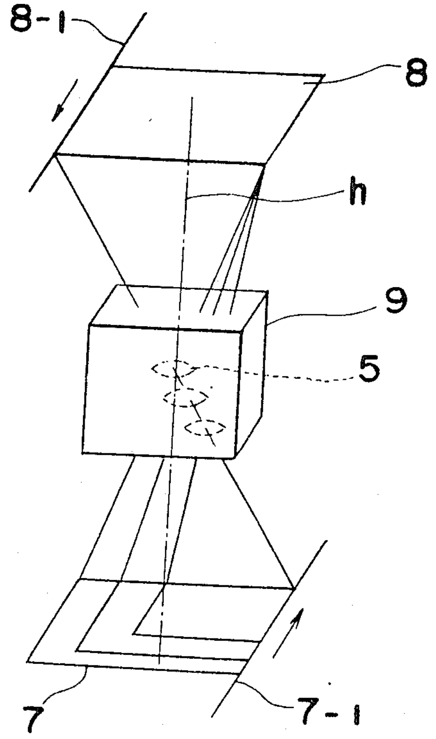
FIG. 2 is a schematic diagram showing the direction of movement of a lens assembly necessitated to achieve the reproduction at different magnifications one at a time while one side of one or more originals is held at the same position on a transparent original support.
Figure 3:
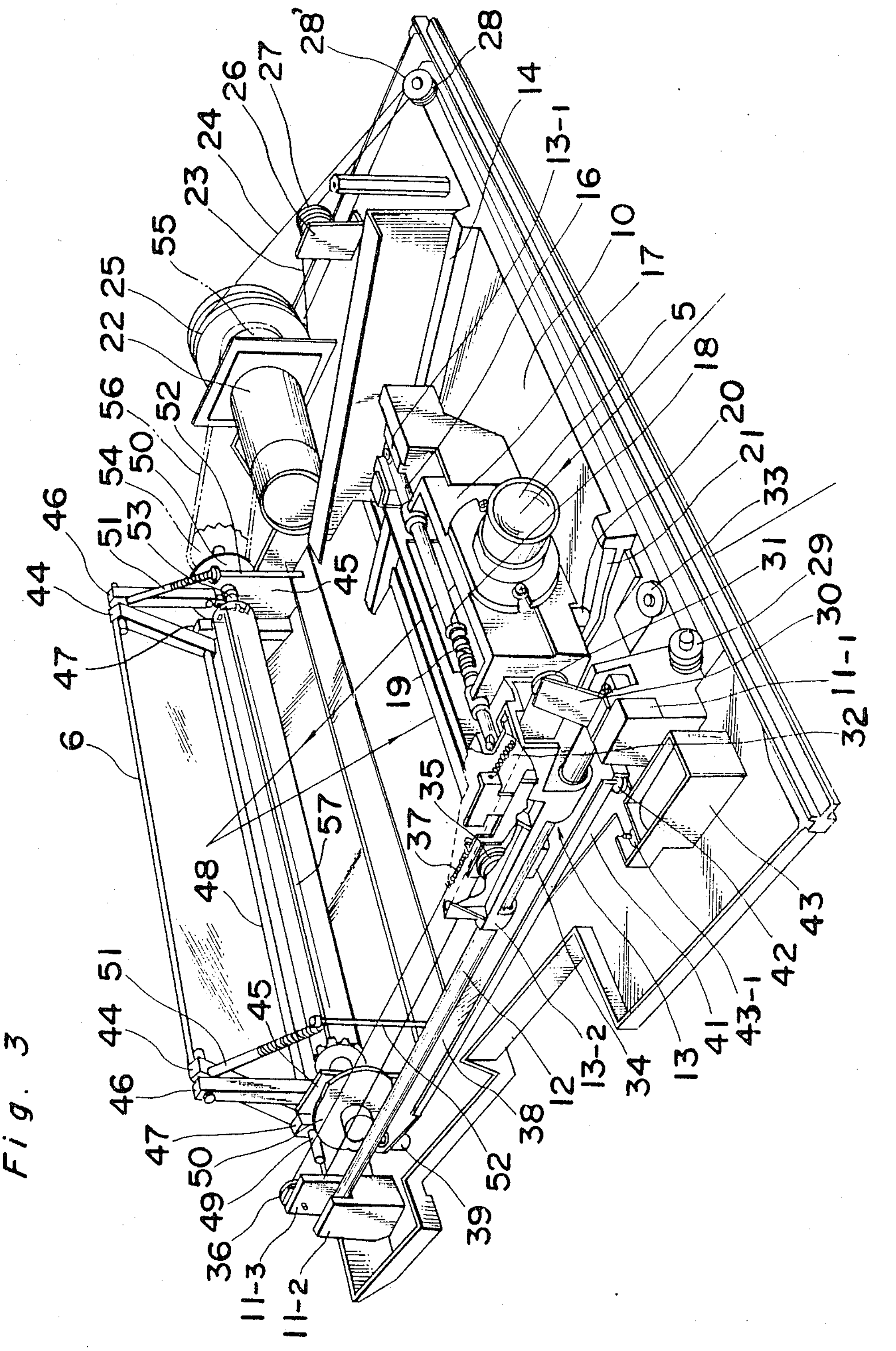
FIG. 3 is a perspective view of a lens positioning mechanism according to a preferred embodiment of the present invention.
Figure 4:
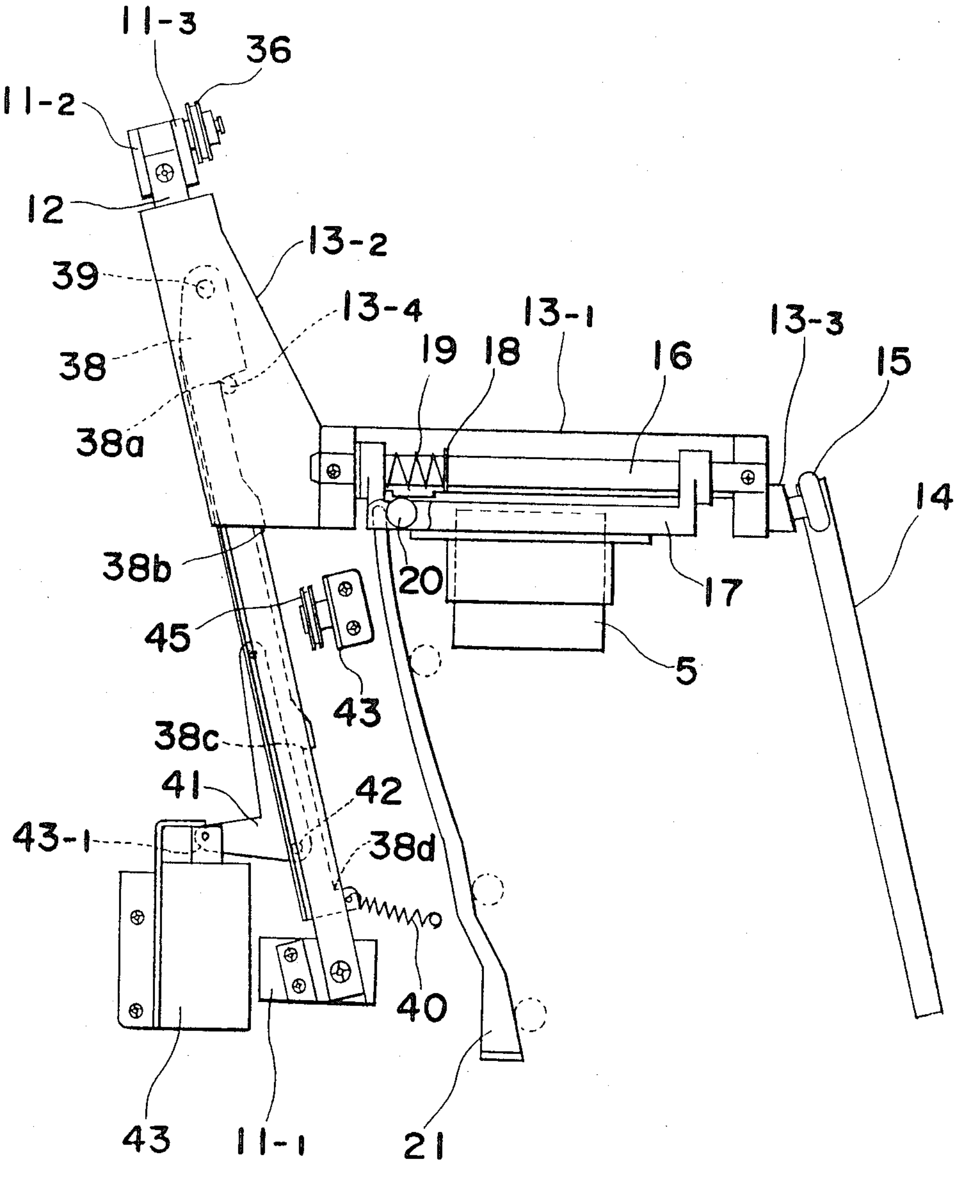
FIG. 4 is a top plan view of a portion of the mechanism shown in FIG. 3, showing a guide mechanism.

Referring now to FIGS. 3 and 4, the lens assembly 5 shown therein is supported for movement in a diagonal direction as hereinbefore discussed with reference to FIGS. 1 and 2, i.e., in a direction at a predetermined angle to the optical axis thereof close to and away from the mirror 6. For this purpose, a lens carriage 13 is slidably mounted on a slide rod 12 extending between a pair of spaced support blocks 11-1 and 11-2 which are in turn rigidly mounted on a bottom plate 10 of a black box forming a part of the optical apparatus 9. The slide rod 12 so supported extends at a certain angle relative to the optical axis (which extends in a Y-axis direction as will be described later) of the lens assembly 5. A guide rail 14 for stabilizing the movement of the lens carriage 13 is rigidly mounted on the bottom plate 10 and extends in parallel to the slide rod 12. The lens carriage 13 is integrally formed with a lens support 13-1 for the support of the lens assembly 5, a bearing block 13-2 slidably supported by the slide rod 12 and a roller bearing 13-3 located on one side of the lens support opposite to the bearing block 13-2 and supporting a roller 15 rotatably above the guide rail 14. The bearing block 13-2 has a shaft 16 fitted thereto, and a lens mount 17 for the support of the lens assembly 5 thereon is slidably mounted on the shaft 16. This lens mount 17 so mounted on the shaft 16 is normally biased to the left, as viewed in FIG. 4, by a spring 19 mounted on the shaft 16 and disposed between a stopper 18 on the shaft 16 and the lens mount 17. A guide pin 20 is rigidly secured to the undersurface of the lens mount 17, which guide pin 20 is cooperable with a generally elongated guide 21 rigidly mounted on the bottom plate 10 as best shown in FIG. 4. With the lens mount 17 biased to the left by the spring 19 as hereinbefore described, the guide pin 20 is held constantly in contact with the guide 21 by the same spring 19 so that, as the lens carriage 13 is moved along the guide rod 12, the lens mount 17 can be moved along the shaft 16 against the spring 19 in a direction generally lateral of the direction of movement of the lens carriage 13 while the guide pin 20 slidingly contacts the guide 21.

Figure 5:
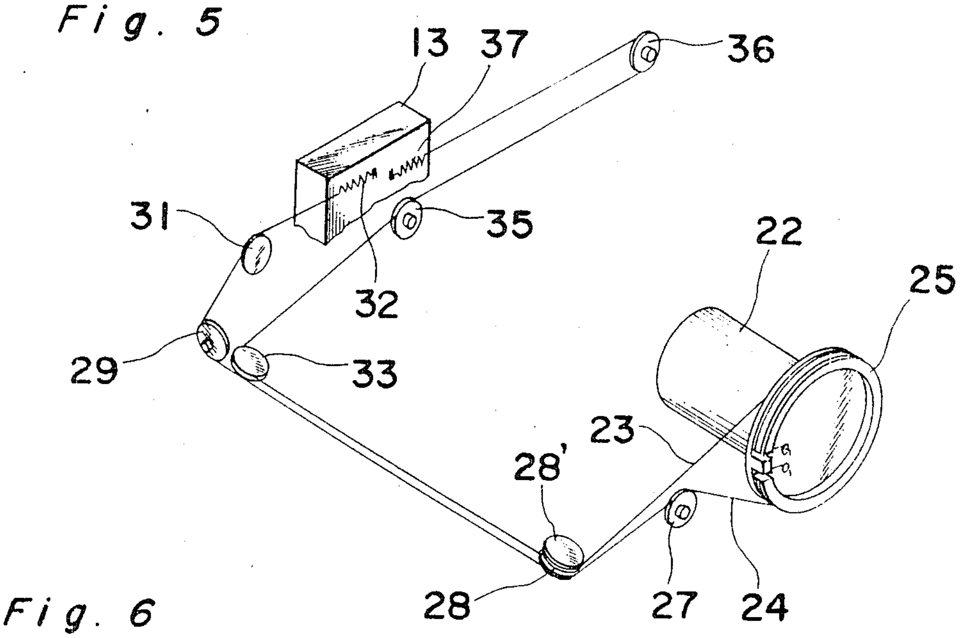
FIG. 5 is a perspective view showing a drive system used in the mechanism of FIG. 3.

The movement of the lens carriage 13 is effected by a drive motor 22 coupled thereto through two lengths of traction cables 23 and 25. Referring to FIG. 5 which best illustrates a drive system for the lens carriage 13, the traction cable 23 has one end rigidly secured to a drive pulley 25 mounted on a drive shaft of the motor 22 for rotation together therewith after having been turned in a substantially single turn around the pulley 25, the other end of the traction cable 23 being connected to the lens carriage 13 through a tensioning spring 32 while a substantially intermediate portion thereof extends first around a guide pulley 27 rotatably mounted on the bottom plate 10 through a fixture 26, then an idle pulley 28 rotatably mounted on the support block, an idle pulley 29 rotatably mounted on the support block 11-1 and finally around a guide pulley 31 rotatably mounted on the support block 11-1 through a fixture 30. Similarly, the traction cable 24 has one end rigidly secured to the drive pulley 25 after having been turned therearound in a direction opposite to the direction of turn of the traction cable 23, the other end thereof being connected to the lens carriage 13 through a tensioning spring 37 while a substantially intermediate portion thereof extends around an idle pulley 28' coaxial with the pulley 28, then an idle pulley 33 rotatably mounted on the bottom plate 10 adjacent the support block 11-1, a guide pulley 35 rotatably mounted on the bottom plate 10 through a fixture 34, and finally around an idle pulley 36 located on one side of the lens carriage 13 opposite to the pulley 31 and rotatably mounted on a fixture 11-3 integral with the support block 11-2.

A positioning strip 38 operable to hold the lens carriage 13 at one of a plurality of, for example, four, positions corresponding to the number of magnifications available in the machine is positioned underneath the guide rod 12 and has one end pivotally mounted on a bearing pin 39 rigidly mounted on the bottom plate 10. The positioning strip 38 so supported is normally biased counterclockwise about the bearing pin 39 as viewed in FIG. 4 by a spring 40 coupled at its opposite ends to the other end of the strip 38 and the bottom plate 10, respectively. A substantially intermediate portion of the strip 38 has a generally L-shaped lever 41 pivotally connected at one end thereto. The L-shaped lever 41 is rotatably mounted at its angled portion on the bottom plate 10 by means of a bearing pin 42 and at the other end to a plunger 43-1 of a solenoid assembly 43. The plunger 43-1 is movable between projected and retracted positions and can, when the solenoid assembly 43 is energized, be moved to the retracted position to cause the lever 41 to pivot counterclockwise, as viewed in FIG. 4, about the bearing pin 42 accompanied by the clockwise pivot of the positioning strip 38 against the spring 40. In this way, the positioning strip 38 can be released from a stop position. The positioning strip 38 has a plurality of, for example, four, detent steps **38*a*, 38*b*, 38*c* and 38*d* defined therein lengthwise thereof, which detent steps 38*a* to 38*d* define positions to which the lens carriage 13 can be repositioned one at a time during the adjustment of the magnification. Cooperable with any one of these detent steps 38*a* to 38*d* is a detent pin 13-4 rigidly secured from below to the bearing block 13-2 of the lens carriage 13, with detent pin 13-4 being engageable in any one of the detent steps 38*a* to 38*d* to hold the lens carriage at the corresponding position so that one or more copies can be made at one of the available magnifications which corresponds to any one of the detent steps 38*a* to 38*d*. For the purpose of the present invention, the detent steps 38*a* to 38*d*** are assumed to correspond to ×1.22 magnification, ×1.0 magnification, ×0.75 magnification and ×0.64 magnification, respectively.

As hereinbefore described with reference to FIG. 1, where the lens assembly 5 employed is of a type having a fixed focal length f, the change in magnification requires not only the repositioning of the lens assembly 5, but also a corresponding adjustment of the fourth mirror 6 in a direction parallel to the optical axis of the lens assembly 5 in the manner as described with reference to and shown in FIG. 1. For this purpose, the mirror 6 positioned rearwardly of the lens assembly 5 is supported by a pair of spaced link mechanisms one on each side of the mirror 6 in a manner which will now be described. The link mechanisms include respective arms 44 supporting the mirror 6 with the opposite ends of the mirror 6 mounted thereon, the arms 44 being pivotally connected at one end to respective arms 46. The arms 46, also constituting parts of the respective link mechanisms, are pivotally mounted on respective side wall members 45 rigidly secured to the bottom plate 10. The arms 44 are also pivotally connected at the other end to respective arms 47 by means of pivot pins 48, the arms 47 being in turn pivotally mounted on the associated side wall members 45. It is to be noted that one end of each of the pivot pins 48 projects outwards from the corresponding arm 47 so as to define a pin extension 49 which confronts with a respective cam plate 50 used to adjust both the angle of inclination of the mirror 6 and the distance between the mirror 6 and the lens assembly 5 in correspondence with the movement of the lens carriage 13 to any one of the four operative positions defined respectively by the detent steps **38*a* to 38*d*. A biasing spring 51 for each of the link mechanisms has one end connected to the end of one of the arms 44 and 46, which are pivotally connected at the other end of the arms 44 and 46, and the other end secured to the bottom plate 10 by means of an anchor pin 52 so that the respective pin extension 49 can be held constantly in contact with the associated cam plate 50**.

The cam plates 50 are rigidly mounted on a shaft 53 extending between and rotatably supported by the side wall members 45, the shaft 53 having a sprocket wheel 54 which is mounted on one end thereof for rotation together therewith. The sprocket wheel 54 is adapted to receive a drive from the motor 22 coupled thereto by means of a substantially endless drive chain 56 running between the sprocket wheel 54 and a drive sprocket wheel 55 rigid on the drive shaft of the motor 22. In this construction, it will be readily understood that, when the motor 22 is rotated, the cam plates 50 are rotated and the link mechanisms, each constituted by the arms 44, 46 and 47, are consequently deformed in shape because the pin extensions 49 are constantly engaged to the respective cam plates 50 as hereinbefore described. The deformation of each of the link mechanisms is such that the fourth mirror 6 can be tilted relative to the optical axis of the lens assembly 5 while being simultaneously moved in a direction parallel to the optical axis of the lens assembly 5 and close toward and away from the lens assembly 5 depending on the direction of movement of the lens carriage 13. For this purpose, each of the cam plates 50 of identical construction is so shaped as to cause the mirror 6 to move a distance corresponding to the distance over which the lens assembly 5 may be moved to any one of the four positions defined respectively by the detent steps 38*a* to 38*d*.

The shaft 53 having the cam plates 50 rigidly mounted on its opposite ends for rotation together therewith carries generally elongated light regulating plates 57 of different widths rigidly mounted thereon so as to surround the shaft 53 and extending between the side wall members 45, the number of the light regulating plates 57 being equal to the number of the magnifications available in the machine, that is, four in the instance now under discussion. These light regulating plates 57 are provided for compensating for change in intensity of light to be projected through the lens assembly 5 onto the photoreceptor surface because the intensity of such light varies with the magnification at which one or more copies are to be made. In operation, the light regulating plates 57 rotate together with the shaft 53 and can be brought one at a time in position to shield the light, reflected from the mirror, in varying degree depending on the magnification at which the lens assembly 5 is set. In this way, at any one of the different magnifications, the photoreceptor surface can advantageously be exposed to an equal amount of light projected through the lens assembly 5.

Figure 6:
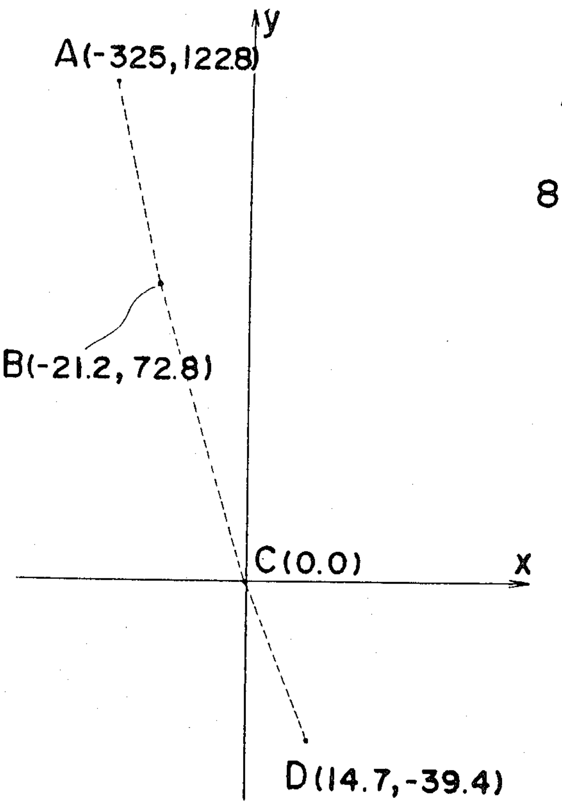
FIG. 6 is a coordinate system illustrating the path of movement of a lens assembly at different positions corresponding to the respective magnifications.
Figure 7:
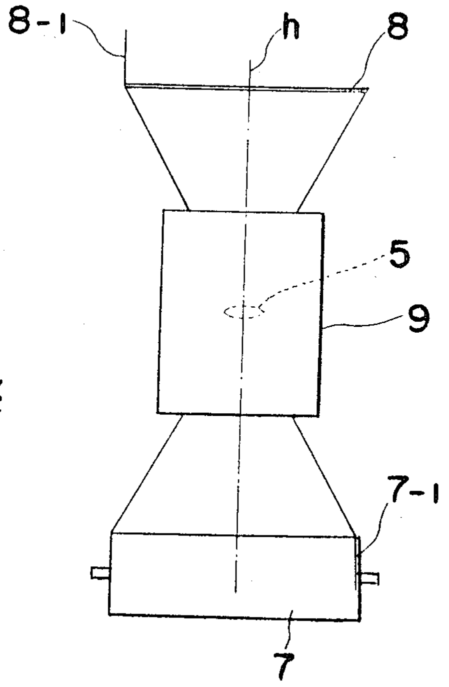
FIG. 7 is a schematic diagram illustrating the correspondence of one side of the original with a reference edge on the photoreceptor where the image of the original is to be formed.

Hereinafter, the details of the guide 21 necessary to move the lens mount 17 along the shaft 16 as the lens carriage 13 is driven along the slide rod 12 will be described with particular reference to FIGS. 4, 6 and 7. FIG. 6 illustrates coordinates to be occupied by the center of the lens assembly 5, 218.36 mm in focal length, for enabling one side of the original 8 to be imagewise projected onto a reference location on the photoreceptor surface adjacent one end of the receptor drum 7 in a manner as shown in FIG. 7. Referring to FIG. 6, the Y-axis represents the direction parallel to the optical axis of the lens assembly 5 and the X-axis represents the direction of movement of the lens mount 17 along the shaft 16 which is at right angles to the Y-axis, the intersection of these axes, i.e., the coordinate (0, 0), representing the position of the lens assembly 5 for the reproduction at ×1 magnification, i.e., for the equal size reproduction. Points A, B, C and D shown in FIG. 6 correspond respectively to the detent steps 38*a*, 38*b*, 38*c* and 38*d*; the point A being the position of the lens assembly 5 for the reproduction at ×0.64 magnification, the point B being the position of the lens assembly 5 for the reproduction at ×0.75 magnification, the point C being the position of the lens assembly 5 for the reproduction at ×1 magnification, and the point D being the position of the lens assembly 5 for the reproduction at ×1.22 magnification. So far illustrated, the points A to D have respective coordinates (−32.5, 122.8), (021.2, 72.8), (0, 0) and (14.7, −39.4). Accordingly, for the reproduction of an image at ×0.75 magnification, the lens assembly 5 has to be moved a distance of 72.8 mm in the Y-axis direction and, at the same time, a distance of −21.2 mm in the X-axis direction from the point C.

In order for the center of the lens assembly 5 to be selectively aligned with any one of the points A to D according to the setting of the magnification, the lens assembly 5 has to be moved not only in a direction along the slide rod 12, but also in a direction along the shaft 16. Therefore, at least one side edge of the guide 21 to which the guide pin 20 contacts as urged by the spring 19 is so shaped and so positioned as to follow the imaginary line drawn between the points A and D through the points B and C on the coordinate system of FIG. 6. Thus, it is clear that, even though the lens carriage 13 is linearly moved along the slide rod 12, the lens assembly 5 can also be moved generally laterally with respect to the path of movement of the lens carriage 13 to align exactly with one of the positions for the reproduction at the different magnifications.

Although in the foregoing embodiment the slide rod 12 has been shown and described as extending at an angle relative to the optical axis of the lens assembly and also relative to one side of the original to be copied, it may extend parallel thereto and, in such case, the lens mount 17 and, hence, the lens assembly 5, will be required to move along the shaft 16 a greater distance than that required in the illustrated embodiment.

Figure 8:
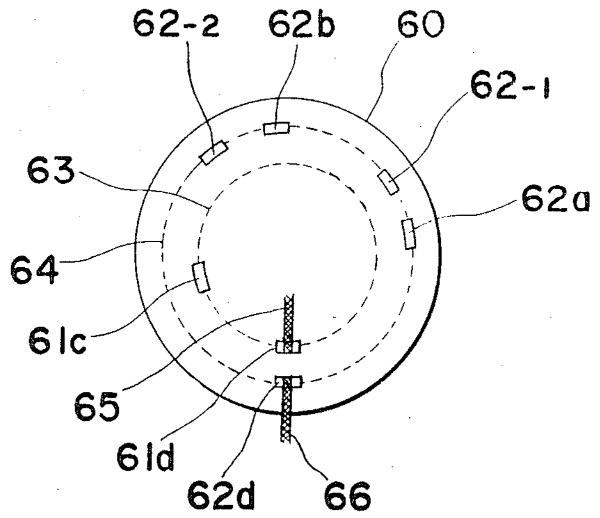
FIG. 8 is a diagram showing an encoder coupled to a motor according to the present invention.
Figure 9:
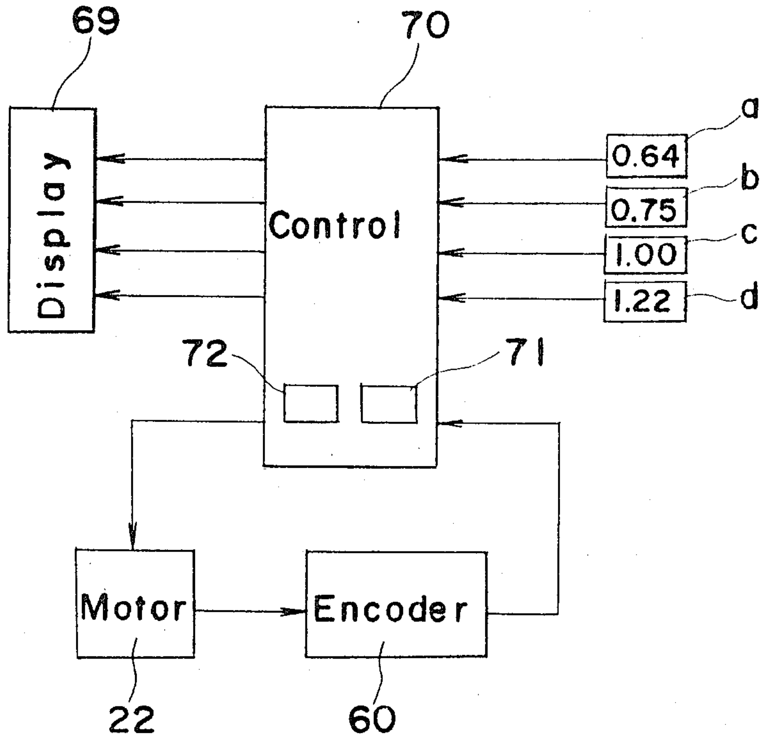
FIG. 9 is a circuit block diagram showing a control circuit for the motor used in the lens positioning mechanism.

The details of a drive control circuit for the motor 22 for driving the lens carriage 13 along the slide rod 12 to selectively reposition it to any one of the positions defined by the detent steps 38*a* to 38*d* will now be described with particular reference to FIGS. 8 and 9. The drive shaft of the motor 22 is equipped with such an encoder 60 as shown in FIG. 8, said encoder 60 being provided with two groups 61 and 62 of electroconductive pieces 61*c*, 61*d* and 62*a* 62-1, 62, 62-2, 62*d* at respective locations corresponding to the positions of the lens assembly 5 for the different magnifications. These groups 61 and 62 of the electroconductive pieces are arranged concentrically with each other in internal and exterior circles 63 and 64. A pair of the electroconductive pieces 61*d* and 62*d* are for indicating the position corresponding to the ×1.22 magnification; the electroconductive piece 61*c* is for indicating the position corresponding to the ×1 magnification; the electroconductive piece 62*b* is for indicating the position corresponding to the ×0.75 magnification; and the electroconductive pieces 62*a* is for indicating the position corresponding to the ×0.64 magnification. The electroconductive pieces 62-1 and 62-2 are arranged frontwardly of the electroconductive pieces 62*a* and 62*b*, respectively, and are used to deenergize the solenoid assembly 43. For the cooperation with the groups 61 and 62 of the electroconductive pieces, there are provided respective detecting brushes 65 and 66 for detecting the electroconductive pieces. Detection signals generated respectively from these brushes 65 and 66 are supplied as an output of the encoder 60 to a control circuit 70 shown in FIG. 9.

The control circuit 70 includes a drive control for the motor 22 and has counters 71 and 72 for counting the number of outputs fed from the encoder 60. This control circuit 70 is operable to control rotation of the motor 22 according to the contents counted by the counters 71 and 72 and also to drive a display unit 69, when one of the signals a, b, c and d indicative of the selected magnification is fed thereto, to effect the display of the selected magnification. More specifically, when, for example, the signal b indicative of the ×0.75 magnification is fed to the control circuit 70, the display unit 69 can be driven to effect the display of any suitable indicia representative of the ×0.75 magnification. The indicia that can be displayed may be either numerical characters or a legend such as, for example, "B4→B5" meaning that the image of the B4 size original can be reproduced on a reduced scale on a B5 size copying paper.

Referring back to FIG. 8, when the detecting brushes 65 and 66 are both in position to detect the electroconductive pieces, the signals therefrom are fed to the control circuit 70 and the control circuit 70 then clears the count contents. Starting from the condition as shown in FIG. 8, and assuming that the signal b indicative of the ×0.75 magnification is fed to the control circuit 70, the latter causes the motor 22 to rotate and, thereafter, receives detection signals from the encoder 60, indicative of the detection of the electroconductive pieces, for counting. Specifically, the signals from the brush 66 are sequentially counted by the counter 72 and, when the count of the counter 72 becomes two, the motor 22 is brought to a halt. At this time, the contents of the counter 71 are neglected. However, when the count of the counter 72 becomes one before it counts two, the solenoid is deenergized. On the other hand, starting from the condition shown in FIG. 8, and assuming that the signal a indicative of the ×0.64 magnification is supplied, the control circuit 70 causes the motor 22 to stop when the count of the counter 72 becomes four, but deenergizes the solenoid assembly 43 when it has counted three. In other words, the outputs generated from the encoder 60 are counted each time the brushes 65 and 66 detect the electroconductive pieces and, when the number counted attains a value corresponding to one of the magnifications, the motor 22 is brought to a halt while the solenoid assembly 43 has been deenergized at the count smaller by one than the count corresponding to such one of the magnification.

However, at the equal size reproduction, when the counter 71 counts the signals from the brush 65, the motor 22 can be brought to a halt. In such case, the solenoid assembly 43 is energized in response to a signal indicative of change in magnification and, when during the reversed rotation of the motor 22, the motor 22 is rotated to the position shown in FIG. 8 which is a home position, the solenoid assembly 43 can be deenergized incident to the supply of the signals from the brushes 65 and 66 to the control circuit 70. That is, simultaneously with the detection of the electroconductive pieces **61*d* and 62*d*, the contents of the counters 71 and 72 are cleared and, in view of the fact that the content of the counter 71 so cleared becomes zero preceding the count one, the control circuit 70 deenergizes the solenoid assembly 43. Thus, provided that the motor 22 is rotated to the home position, the solenoid assembly 43 can be deenergized only when one of the signals c and d indicative of the equal size reproduction and the ×1.22 magnification, respectively, is supplied to the control circuit 70**.

The motor 22 can be reversed when the copying machine is fed with an electric power, and/or when a signal for changing the magnification to a greater magnification is supplied to the control circuit 70. However, upon return to the home position, the motor 22 being reversed is brought to a halt and starts its normal rotation to bring the lens assembly to one of the positions corresponding to the desired magnification.

As a matter of practice, since the equal size reproduction is more frequently utilized than at the other magnifications, it is preferred that the lens assembly 5 can be automatically repositioned at one of the positions defined by the detent step **38*c* in the positioning strip 38 when the copying machine is fed with electric power. For this purpose, a signal equivalent to the signal indicative of the equal size reproduction is supplied to the control circuit 70 in response to the start of the supply of the electric power to the copying machine. In response to this equivalent signal, the control circuit 70 controls the motor 22 in a manner similar to that during the equal size reproduction. Should the lens assembly 5 have already been held at the position for the equal size reproduction at that time, it can remain unchanged because the signal from the electroconductive piece 61*c* is applied to the control. Thus, it is clear that, since the groups 61 and 62 of the electroconductive pieces representative of the respective magnifications are arranged in the internal and external circles 63 and 64 on the encoder 60, the home positions for the motor 22 (the position corresponding to the ×1.22 magnification) and the other positions corresponding respectively to the other magnifications can advantageously readily be confirmed. That is, the counters 71 and 72 of the control circuit 70** retain their contents during the supply of the electric power and, therefore, each position corresponding to the respective magnification can be recognized.

Thus, the design is such that the lens carriage 13 can be driven to one of the positions defined respectively by the detent steps **38*a* to 38*d* by means of the traction cables 23 and 24 according to the angular displacement of the encoder 60 of the motor 22**.

Hereinafter, the operation of the lens positioning mechanism according to the present invention will be described. At the time the electric power is supplied to the copying machine, the control circuit 70 receives the signal at that time and causes the motor 22 to be reversed (i.e., rotated in a counterclockwise direction as viewed in FIG. 3). When the signal indicative of the home position of the encoder 60 is generated incident to the rotation of the motor 22, the rotation thereof is brought to a halt. Should the lens assembly 5 at that time be held at the position required to make a copy at the ×1.22 magnification, the motor 22 will not rotate irrespective of whether the electric power has been supplied. In this condition, the solenoid assembly 34 is deenergized and the detent pin 13-4 secured to the bearing block 13-2 of the lens carriage 13 is engaged in the detent step **38*d* in the positioning strip 38. In the illustrated embodiment, the lens assembly 5 is adapted to be automatically brought to the position required to achieve the equal size reproduction simultaneously with the initiation of the supply of the electric power by the reason as hereinbefore stated, and for this purpose, the motor 22 is caused to rotate in a normnal direction clockwise as view in FIG. 3 subsequent to the above described operation. At the time the signal detected by the brush 65 is outputted from the encoder 60, the counter 71 in the control circuit 70 counts the signal and, thereafter, the control circuit 70 causes the motor 22 to stop. The solenoid assembly 43 is in a condition being deenergized and the positioning strip 38 is biased to an engaging position. Therefore, when the detent pin 13-4 in the lens carriage 13 is brought into engagement with the detent step 38*c* incident to the rotation of the motor 22, the motor 22 is brought to a halt, positioning the carriage 13 at the position required to achieve the equal size reproduction. In this case, although the lens carriage 13 tends to move further under the influence of its own inertia, the springs 32 and 37 connected respectively to the traction cables 23 and 24 act to prevent the lens carriage 13** from overrunning.

Simultaneously, with the movement of the lens carriage 13, the lens mount 17 is moved in the X-axis direction with the guide pin 20 slidingly contacting the guide 21 as biased by the spring 19.

By this movement, the rotation of the motor 22 is transmitted through the sprocket wheels 54 and 55 and the drive chain 56 to the shaft 53 which is then rotated through an angle equal to the angle of rotation of the encoder 60 of the motor 22. The rotation of the shaft 53 causes the cam plates 50 to rotate, thereby pushing the pin extensions 49 to move the fourth mirror 6 towards the position required to achieve the equal size reproduction in the same direction as the lens carriage 13 is moved. At this time, by the action of the link mechanisms each comprised of the arms 44, 46 and 47, the mirror 6 is tilted in the direction as shown in FIG. 1 simultaneously with this movement wherefor the image of the original can be projected onto the photoreceptor drum at a definite location.

The foregoing is a description of the movement of the lens assembly 5 to the position required to achieve the equal size reproduction incident to the initiation of the electric power supply. In any event, by the initiation of the electric power supply, the control circuit 70 executes a motor drive control for the equal size reproduction in response to the receipt of the signal equivalent to the signal d indicative of the equal size reproduction.

Should copies be desired to be reproduced at the ×0.64 magnification while the lens assembly 5 is held at the position for the equal size reproduction, the signal a indicative of the ×0.64 magnification is supplied to the control circuit 70. In response to this signal, the control circuit 70 causes the solenoid assembly 43 to be energized to release the detent pin 13-4 from the positioning strip 38 and, at the same time, causes the motor 22 to rotate. When the detent pin 13-4 is disengaged from the detent step 38*c* in the detent strip 38, the rotation of the motor 22 is transmitted through the traction cables 23 and 24 to the lens carriage 13 to move the latter along the slide rod 12. The signal from the encoder 60, particularly from the brush 66, generated incident to the rotation of the motor 22, is counted by the counter 72 in the control circuit 70. The motor 22 continues rotating until the count of the counter 72 subsequently becomes four. When the counter 72 has, however, counted to the count three preceding the count four, the control circuit 70 causes the solenoid assembly 43 to be deenergized.

Therefore, at the time the motor 22 is brought to a halt, the detent pin 13-4 is engaged in the detent step 38*a* and the lens carriage 13 is therefore held at the position required to achieve the ×0.64 magnification. On the other hand, the lens mount 17 has been displaced in the X-axis direction as shown in FIG. 4 so that the lens assembly 5 can align the one side of the original with the reference edge of the photoreceptor drum to enable the image of the original to be projected onto the photoreceptor drum in a centered fashion. In addition, since the shaft 53 is at this time rotated through an angle equal to the angle of rotation of the motor 22, the mirror 6 having been pushed by the cam plates 50 is rotated simultaneously with the movement in a direction parallel to the optical axis of the lens assembly 5.

In this condition, the image of the original can be formed on the photoreceptor drum 7 at ×0.64 magnification with respect to the size of the original, with one side of the original aligned imagewise with the reference edge of the drum 7 in the manner as shown in FIG. 7. This image can be transferred onto a copying paper fed in a controlled manner with one side thereof aligned with the reference edge of the photoreceptor drum.

In the event that, while the lens assembly 5 is held at the position for the ×0.64 magnification, the copies are desired to be made at the ×0.75 magnification, the lens positioning mechanism according to the present invention operates in the following manner. When the signal b indicative of the ×0.75 magnification is supplied to the control circuit 70, the control circuit 70 causes the motor 22 to be reversed. As hereinbefore described, when the signal indicative of the change in magnification is fed to the control circuit 70, the control circuit 70 reverses the direction of rotation of the motor 22 in the event that the magnification represented by such signal is greater than the previous magnification at which the copies have been made. Thus, where the lens assembly 5 is held at the position for the ×0.64 magnification and is desired to be moved to the position for the ×0.75 magnification, the motor 22 is unconditionally reversed in response to the application of the signal indicative of the change in magnification. When the motor 22 is subsequently rotated to the home position, the contents of the counters 71 and 72 in the control circuit 70 are simultaneously cleared. When the individual signals are generated from the encoder 60 as a result of the normal rotation of the motor 22 caused by the control circuit 70, these signals are counted respectively by the counters 71 and 72. The control circuit 70, in view of the fact that the signal b indicative of the ×0.75 magnification is applied thereto, brings the motor 22 to a halt when the counter 72 has counted to the count two while the content of the counter 71 is neglected. However, the control circuit 70 has deenergized the solenoid assembly 43 at the time the counter 72 had counted to the count one preceding the count two. Accordingly, the lens carriage 13 is repositioned at the position corresponding to the position for the ×0.75 magnification and, simultaneously therewith, the lens mount 17 is moved in the X-axis direction, thereby bringing the lens assembly 5 to the position for the ×0.75 magnification. At the same time, the mirror 6 is also moved in a manner similar to that hereinbefore described.

When the signal indicative of the change in magnification to the ×0.75 magnification is entered, and the lens carriage 13 is moved in a reverse direction as a result of the reversed rotation of the motor 22, the solenoid assembly 43 is energized with the positioning strip 38 consequently released from the stop position and, therefore, the detent pin 13-4 does not contact the detent step 38*b* and the movement of the lens carriage 13 will not be disturbed. During this reversed rotation of the motor 22, if the detent steps 38*a* to 38*d* are so shaped as shown, the positioning strip 38 can be pivoted against the spring 40 allowing the detent pin 13-4 to move over the detent steps 38*b* and 38*c* and, therefore, the lens carriage 13 can be moved in the reverse direction with no necessity of the solenoid assembly 13 being energized. However, there is the possibility that, when the positioning strip 38 returns to the stop position biased by the spring 40 after the detent pin 13-4 has moved over the detent steps 38*b* and 38*c*, a noise resulting from the collision may be generated. For avoiding the generation of such a noise, it is preferred to keep the solenoid assembly 43 in the energized condition during the reverse movement of the lens carriage 13.

At the time the lens assembly 5 has been repositioned correctly at the position for the ×0.75 magnification in the manner as hereinbefore described, the counter 72 in the control circuit 70 stores the count two. However, when the signal a indicative of the ×0.64 magnification is fed thereto, it counts the signals fed from the encoder 60 resulting from the rotation of the motor 22.

Where the reproduction at the ×1.22 magnification is desired subsequent to the reproduction at the ×0.75 magnification, the control circuit 70 upon receipt of the signal d unconditionally reverses the rotation of the motor 22. When the signal indicative of the encoder 60 returning to the home position is subsequently applied, the motor 22 is brought to a halt with the lens assembly 5 consequently retained at the position for the ×1.22 magnification. At this time, the solenoid assembly 43 is energized in response to the application of the signal d and is deenergized in response to the signal indicative of the return of the encoder 60 to the home position. The counters 71 and 72 in the control circuit 70 are then cleared.

As hereinbefore described, the control circuit 70 controls the angular movement of the motor 22 in response to the signal from the encoder 60 and in dependence on the signal indicative of the selected magnification and, therefore, the lens carriage 13 can be repositioned accurately to one of the predetermined positions. Nevertheless, as the lens carriage 13 is moved to any one of the positions defined by the detent steps 38*a* to 38*d*, the lens mount 17 is also moved in the X-axis direction, thereby bringing the lens assembly to one of the positions for the different magnifications.

In addition, no microswitches or the like such as hitherto employed are required to detect the repositioning of the lens carriage 13 according to the present invention and, instead thereof, the lens carriage 13 is controlled by the encoder 60 capable of generating the signal indicative of the angular movement of the motor 22. Therefore, the repositioning of the lens assembly can be accurately performed.

It is to be noted that the present invention, although in the foregoing embodiment the lens assembly 5 has been moved each time the magnification is changed, can be equally applicable to the system wherein the focal length f is changed by the use of an auxiliary lens assembly or by the use of a zoom lens assembly, to keep the sum of the distances a and b at a constant value. In this case, the mirror 6 is fixed at a definite position. It is also to be noted that, although it has been described that one side of the original is optically aligned with one edge of the photoreceptor drum, reference may be set up at any desired location. By way of example, a line spaced 8 mm from one side of the original may be set up as the reference so that one side of the image of the original can be formed on the photoreceptor drum at a location spaced 8 mm from one edge thereof.

Although the present invention has fully been described in connection with the preferred embodiment thereof with reference to the accompanying drawings, it is to be noted that various changes and modifications are apparent to those skilled in the art. For example, the present invention can equally be applicable to a copying machine of any type wherein the transparent original support is either movable or stationary. Therefore, unless they depart from the scope of the present invention defined by the appended claims, such changes and modifications are to be understood as included therein.

We claim:

1. A lens positioning mechanism for an electrophotographic copying machine capable of reproducing a copy of an original at a plurality of different magnifications one at a time, said machine comprising an optical apparatus including a lens assembly having a optical axis supported for movement to any one of several operative positions each required for the reproduction of a copy at said respective magnification, a lens mount for the support of a lens assembly a lens carriage supported for movement in a direction close toward and away from a photoreceptor and having a detent positions equal in number to that of the available magnifications, said lens mount being mounted on said lens carriage for movement in a direction perpendicular to said optical axis during movement of said operative positions determined by a respective detent position assumed by said lens carriage said guide means comprising a generally elongated guide extending at a predetermined angle relative to said optical axis, and a guide pin secured to said lens mount and slidingly engaged with said guide.

2. The lens positioning mechanism of claim 1, wherein said lens carriage is slidingly mounted on a slide rod extending between a pair of spaced support blocks rigidly mounted on a bottom plate of said optical apparatus said slide rod supported as to extend at a specified angle relative to said optical axis of said lens assembly.

3. The lens positioning mechanism of claim 2, wherein said lens mount for support of said lens assembly is slidingly mounted on a shaft such that said lens mount is normally biased by a spring mounted on said shaft disposed between a stopper and said lens mount, said guide pin being rigidly secured to an undersurface of said mount, said guide pin being cooperable with said elongated guide, which elongated guide is rigidly mounted to said bottom plate of said optical apparatus, such that said guide pin is held constantly in contact with said guide by said spring so that as said lens carriage is moved along said guide rod, said lens mount can be moved along said shaft against a force of said spring in a direction generally lateral to the direction of movement of said lens carriage while said guide pin slidingly contacts said guide.

* * * * *